(12) United States Patent (10) Patent No.: US 8,292,173 B2
Yturralde et al. (45) Date of Patent: Oct. 23, 2012

(54) METHODS AND SYSTEMS FOR TRACKING INVENTORY USING AN RFID TAG TAPE

(75) Inventors: Mark Yturralde, San Diego, CA (US); Graham Ross, Poway, CA (US)

(73) Assignee: CareFusion 303, Inc., San Diego, CA (US)

( * ) Notice: Subject to any disclaimer, the term of this patent is extended or adjusted under 35 U.S.C. 154(b) by 408 days.

(21) Appl. No.: 12/638,786

(22) Filed: Dec. 15, 2009

(65) Prior Publication Data

US 2011/0139871 A1 Jun. 16, 2011

(51) Int. Cl.
*G06F 19/00* (2011.01)
(52) U.S. Cl. .................................................. 235/385
(58) Field of Classification Search .................. 235/383, 235/385, 492, 435, 439, 487
See application file for complete search history.

(56) References Cited

U.S. PATENT DOCUMENTS

| | | | |
|---|---|---|---|
| 6,563,425 B2 * | 5/2003 | Nicholson et al. | 340/572.7 |
| 6,851,617 B2 | 2/2005 | Saint et al. | |
| 7,178,729 B2 * | 2/2007 | Shaffer et al. | 235/385 |
| 7,262,698 B1 * | 8/2007 | Frederick et al. | 340/545.6 |
| 7,410,103 B2 | 8/2008 | Nagel | |
| 7,474,220 B2 * | 1/2009 | Choi et al. | 340/572.7 |
| 2005/0242959 A1 * | 11/2005 | Watanabe | 340/572.7 |
| 2006/0273905 A1 | 12/2006 | Choi et al. | |
| 2007/0008121 A1 | 1/2007 | Hart | |
| 2007/0023516 A1 | 2/2007 | Chapman et al. | |
| 2009/0009332 A1 | 1/2009 | Nunez et al. | |
| 2009/0289777 A1 | 11/2009 | Goll et al. | |

FOREIGN PATENT DOCUMENTS

| | | |
|---|---|---|
| JP | 2009-230500 | 10/2009 |
| WO | WO 2006/080857 | 8/2006 |

OTHER PUBLICATIONS

International Search Report and Written Opinion for PCT/US2010/060366 mailed Aug. 25, 2011 in 12 pages.
Bolotnyy et al., "The Case for Multi-Tag RFID Systems", IEEE Computer Society, 2007, pp. 174-186.

* cited by examiner

*Primary Examiner* — Seung Lee
(74) *Attorney, Agent, or Firm* — McDermott Will & Emery LLP

(57) ABSTRACT

A method of tracking an inventory comprises associating a plurality of radio frequency identification (RFID) values corresponding to a plurality of RFID tags with an inventory item, affixing the plurality of RFID tags to a plurality of surfaces of the inventory item such that antenna axes of the plurality of RFID tags are oriented in a plurality of directions, wirelessly sensing RFID tags affixed to items in the inventory using an antenna array comprising one or more antennae, and deciding, if one or more of the plurality of RFID values associated with the inventory item is sensed, that the inventory item is present in the inventory, otherwise deciding that the inventory item is not present in the inventory.

21 Claims, 9 Drawing Sheets

METHODS AND SYSTEMS FOR TRACKING INVENTORY USING AN RFID TAG TAPE

FIELD

The present disclosure relates, in general, to inventory tracking and, more particularly, to an inventory tracking system using RFID tags.

BACKGROUND

Evolution of radio frequency identification (RFID) technology has made it possible to track items of inventory wirelessly by affixing an RFID tag to each inventory item and wirelessly sensing the RFID tag using a sensory antenna array. If the antenna array can sense the RFID tag, a decision is made that the corresponding item is present in the inventory. Conversely, if the antenna array does not sense the RFID tag, a decision is made that the corresponding item is not present in the inventory.

One operational issue in the wireless tracking of inventory items is that an antenna array may not sense an RFID tag that is in a "blind spot" for the antenna array. For example, an RFID tag may be occluded from the antenna array by another inventory item or an RFID tag may be oriented in a direction in which the antenna array has a low directional sensitivity, resulting in a missed read of the RFID tag by the antenna array.

In certain applications, errors in inventory tracking, such as caused by a failure to read an RFID tag by a sensory antenna array may have significant undesirable operational consequences. For example, in a healthcare facility, incorrect charges may result of an item is erroneously tracked as being removed from a medical cabinet.

SUMMARY

The above discussed and other concerns are fulfilled by inventory tracking systems and methods according to various configurations described in the present disclosure.

In one aspect of the disclosure, a method of tracking an inventory, comprises associating a plurality of radio frequency identification (RFID) values corresponding to a plurality of RFID tags with an inventory item, affixing the plurality of RFID tags to a plurality of surfaces of the inventory item such that antenna axes of the plurality of RFID tags are oriented in a plurality of directions, wirelessly sensing RFID tags affixed to items in the inventory using an antenna array comprising one or more antennae and deciding, if one or more of the plurality of RFID values associated with the inventory item is sensed, that the inventory item is present in the inventory, otherwise deciding that the inventory item is not present in the inventory.

In another aspect of the disclosure, an inventory tracking system comprises an RFID tape comprising a plurality of RFID tags mounted on a substrate, the RFID tape affixable to an inventory item using an adhesive bottom surface of the substrate, an antenna array comprising one or more antennae configured to sense RFID tags and a computer coupled to the antenna array and configured to track a plurality of inventory items.

In yet another aspect of the disclosure, an RFID tag tape for use in an inventory tracking system comprises a substrate having a top surface and a bottom surface, a plurality of RFID tags mounted on the top surface of the substrate, each RFID tag comprising an antenna for transmitting and receiving radio frequency signals, and an adhesive layer covering the bottom surface of the substrate, the adhesive layer provided for affixation of the RFID tag tape to an inventory item. Each of the plurality of RFID tags has an associated unique identifier. The RFID tag tape is capable of being rolled into a roll.

The foregoing and other features, aspects and advantages of the embodiments of the present invention will become more apparent from the following detailed description and accompanying drawings.

DETAILED DESCRIPTION

The embodiments of the present disclosure address and solve problems related to the tracking of inventory items by providing, in part, a method of tagging inventory items with multiple RFID tags and tracking the inventory items based on sensing any of the multiple RFID tags. In one aspect, an RFID tag tape is disclosed comprising a linear arrangement of RFID tags to facilitate easy application to multiple surface areas of an inventory item.

Broadly and generally, two or more RFID tags are respectively applied to multiple surfaces of an inventory item so that regardless of position and orientation of the inventory item, an antenna array is able to sense at least one of the RFID tags affixed to the inventory item with a very high degree of probability.

In certain aspects, a computer system is disclosed for tracking inventory items tagged with multiple RFID tags. A user can enter multiple RFID tag identification values in a database in communication with the computer system and associate the multiple RFID tag identification values with a single inventory item. The computer system makes a decision regarding the presence or absence of the item in the inventory by checking if any one of the RFID tags associated with the item are sensed by an antenna array coupled to the computer system.

As used herein, an RFID tag may be of one of a well-known RFID tag type such as a magnetically coupled RFID tag, an electrically coupled RFID tag or a multiple frequency RFID tag. Correspondingly, an antenna array used to sense RFID tags may be comprise antenna elements for sensing using magnetic or electrical or multiple frequency coupling with RFID tags.

Figure 1A:
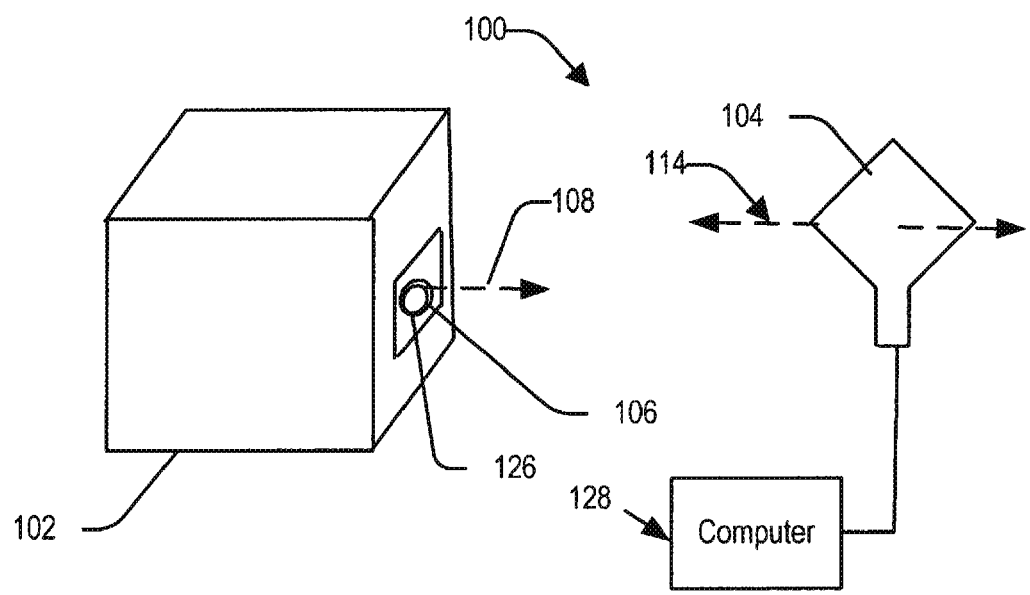
FIG. 1A is a diagrammatic representation of an RFID inventory tracking system, in accordance with certain configurations of the present disclosure.
Figure 1B:
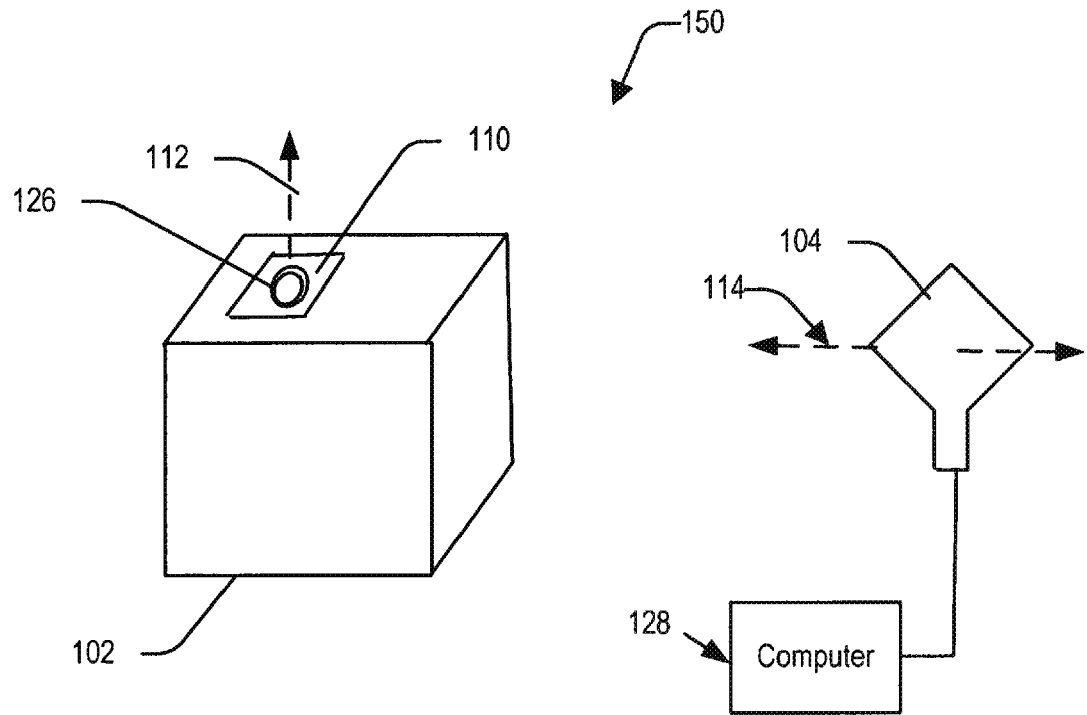
FIG. 1B is a diagrammatic representation of an RFID inventory tracking system, in accordance with certain configurations of the present disclosure.

FIGS. 1A and 1B depict prior art RFID inventory tracking systems that highlight certain operational problems associated with inventory tracking by attaching a single RFID tag and/or affixing RFID tags to a single surface of an inventory item. In particular, FIG. 1A depicts an example wherein inventory item 102 is oriented to maximize the probability of success of sensing of inventory item 102 by RFID antenna 104 and FIG. 1B depicts an example wherein inventory item 102 is oriented to be in the blind spot of RFID antenna 104, thereby causing RFID antenna 104 to miss sensing inventory item 102.

FIG. 1A is a diagrammatic representation of a portion of prior art RFID inventory tracking system 100. Computer 128 is equipped with a communication module (e.g., a RFID transceiver circuit board) configured to transmit and receive messages with antenna array 104. Antenna array 104 is configured to sense RFID tags. Antenna array 104 may include a single antenna or multiple antennae positioned at multiple locations (e.g., top and bottom surfaces of a medicine cabinet) to sense inventory items from different directions. In certain configurations, individual antennae of antenna array 104 are planar metal coil loops. A planar antenna, such as antenna 114 depicted in FIG. 1A, typically has non-isotropic radio frequency (RF) field characteristics. In other words, a planar antenna usually has a different receiving and/or transmitting efficiency in different directions. For example, it is well-known that a planar antenna coil typically radiates most power in the direction orthogonal to the plane of the antenna coil. For example, axis 114 in FIG. 1A represents the direction of best transmission/reception performance by antenna array 104. The deficiency of non-isotropic performance of a single antenna is solved, in known solutions, by using multiple antennae, oriented in different directions, to achieve equal RF performance in all directions. However, the use of multiple RF antennae is expensive and is undesirable due to the increased amount of time taken to perform reading operations with the multiple RF antennae.

Still referring to FIG. 1A, inventory item 102 has RFID tag 106 affixed. In certain configurations, RFID tag 106 is a planar label. As is well known in the art, a typical RFID tag 106 includes an antenna 126 used for RF communication with antenna array 104. Antenna 126 is, for example, a coil for magnetic field communication and a dipole antenna for electric field communication with antenna array 104. In general, antenna 126 has a sensitivity axis 108 and the sensitivity of communication falls as the angle between the sensitivity axis 108 and sensitivity axis 114 of antenna array 104 increases. Signal transmission/reception performance of RED tag 106 will typically be the best when sensitivity axes 114 and 108 are aligned. Coupling between RFID tag 106 is reduced as the angle between sensitivity axes 114 and 108 increases, becoming effectively zero, when the two axes are at a right angle, as depicted in FIG. 1B.

FIG. 1B shows configuration 150 of a portion of a system 100 with inventory item 102 oriented in a different direction compared to FIG. 1A. Inventory item 102 is now oriented such that affixed RFID tag 110 has its antenna axis 112 orthogonal to antenna axis 114. With antenna axis 112 of RFID tag antenna 126 orthogonal to antenna axis 114 of antenna array 104, in general, antenna array 104 may be in a "blind spot" of antenna array 104, i.e., antenna array 104 may not be able to "see" or sense RFID tag 110 with a high probability of success due to weak coupling between antenna array 104 and RFID tag 110. In some orientations of inventory item 102, antenna array 104 may not be able to sense RFID tag 110 at all. Even if inventory item 102 is designed to avoid the operational problem of mis-orientation of RFID tag 110, for example, by giving a user visual cues about where to affix RFID tag 110 and how to place inventory item 102 in inventory (e.g., by printing a "this side up" notice on inventory item 102), inventory item 102 could get mis-oriented due to tumbling of inventory item 102 during storage and usage or a user error in choosing the correct surface of inventory item 102 to apply RFID tag 110.

Referring to FIGS. 1A and 1B, in general, the antenna axis of inventory item 102 may be at an angle between a fully aligned position (e.g., as depicted in FIG. 1A) and a fully orthogonal position (e.g., as depicted in FIG. 1B). Therefore, in general, the sensing of inventory item 102 by antenna array 104 is a probabilistic event, having the highest probability of sensing when the antenna axis is aligned with antenna axis 114 of antenna array 104 and the lowest probability of sensing when the antenna axis is orthogonal to antenna axis 114. During operation, inventory item 102 may re-orient due to tumbling or become occluded resulting in inventory item 102 not being sensed by antenna array 104, causing inventory tracking computer 128 to show an incorrect status of inventory item 102.

Figure 2A:
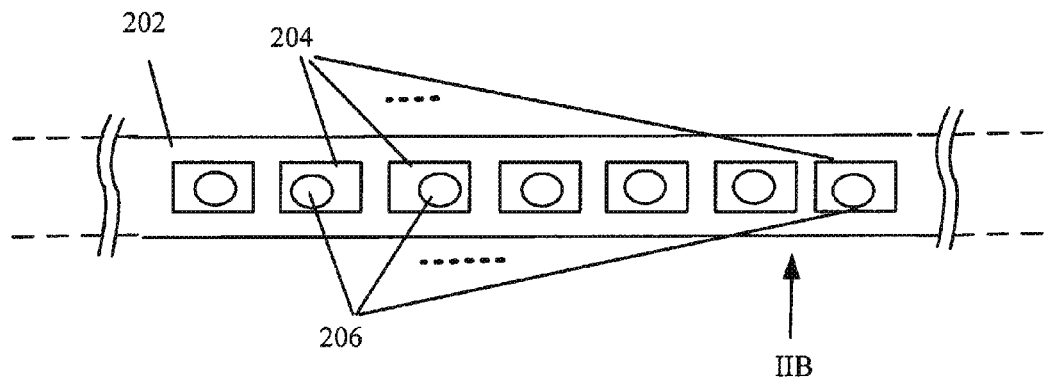
FIG. 2A is a diagrammatic representation of an RFID tag tape, in accordance with certain configurations of the present disclosure.

FIG. 2A is a diagrammatic representation of a portion of RFID tag tape 202, in accordance with certain configurations of the present disclosure. In certain aspects, RFID tag tape 202 is useful in overcoming operational problems related to misalignment of antenna axes. RFID tag tape 202 comprises a plurality of RFID tags 204, each having antenna coil 206. In certain configurations, RFID tags 204 are arranged on RFID tag tape 202 similar to stamps on a roll of postage stamps. In certain embodiments, RFID tags 204 may be of more than one type, e.g., a magnetically coupled RFID tag, an electrically coupled RFID tag or a multiple frequency RFID tag.

In certain configurations, each RFID tag 204 is individually peelable off RFID tag tape 202. RFID tags 204 are permanently affixed to RFID tag tape 202 and RFID tag tape 202 is configured to be affixable to inventory item 102 (e.g., by providing an adhesive underside). In certain other configurations, in operation, a user may unroll a roll of RFID tag tape 202, cut or detach a desired length of the tape and wrap and affix a desired length around an inventory item. In certain configurations, each RFID tag 204 has a unique identification number associated with the RFID tag 204. In certain configurations, identification numbers of RFID tags 204 adjacent to another RFID tag 204 on RFID tag tape 202, are contiguous (e.g., identification number 0x01, 0x02, 0x03, and so on). In certain configurations, identification numbers of RFID tags 204 are in a random order. In certain configurations, RFID tag tape 202 is made of a flexible plastic or paper material such that RFID tag tape 202 can be rolled into a roll.

Figure 2B:
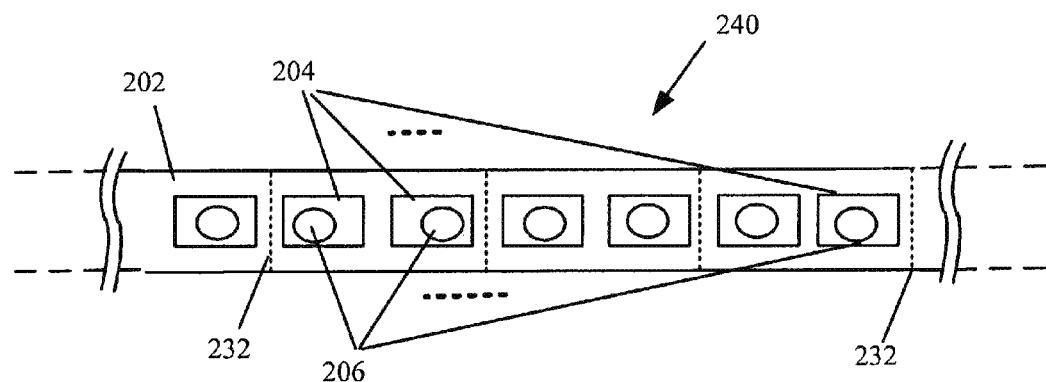
FIG. 2B is a diagrammatic representation of an RFID tag tape, in accordance with certain configurations of the present disclosure.

FIG. 2B is a diagrammatic representation of a portion of RFID tag tape 202, in accordance with certain configurations of the present disclosure. In the embodiment depicted in FIG. 2B, RFID tag tape 202 includes perforations 232 between every two RFID tags 204 to help with easy tearing of RFID tag tape 202 by a user. In general, certain embodiments of RFID tag tape 202 may include perforations 232 after a regular number of RFID tags 202 (e.g., between every two or three RFID tags 204) or at irregular spacing (e.g., after every N RFID tags 202, where N is an integer between 1 and 10).

Figure 2C:
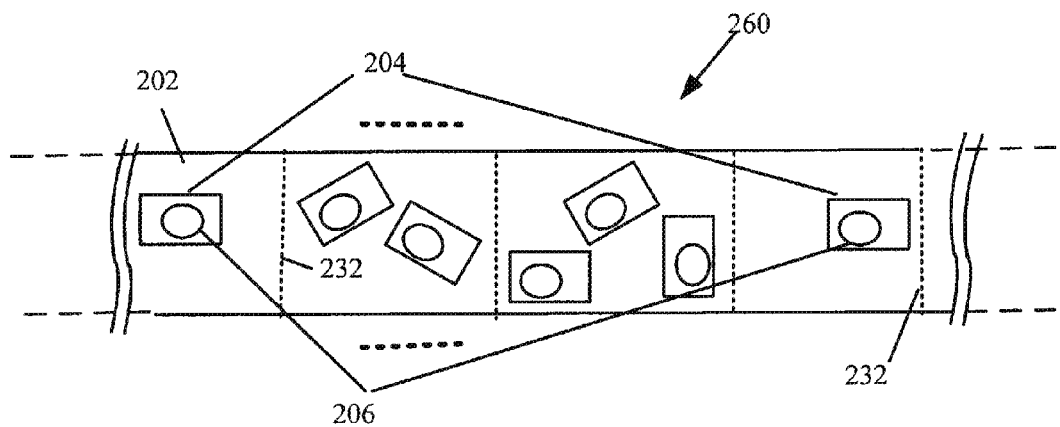
FIG. 2C is a diagrammatic representation of an RFID tag tape, in accordance with certain configurations of the present disclosure.

FIG. 2C is a diagrammatic representation 260 of a portion of RFID tag tape 202, in accordance with certain configurations of the present disclosure. In the embodiment depicted in FIG. 2C, RFID tag tape 202 includes RFID tags 204 positioned on RFID tag tape 202 at irregular intervals and at random orientations. The depicted diagrammatic representation 260 includes perforations 232. In various embodiments, perforations 232 may be placed differently or may be omitted. In one aspect, random orientation of RFID tags 204 facilitates random orientation of corresponding sensitivity axes 108, when a portion of RFID tag tape 202 is affixed to a surface of an inventory item.

Figure 2D:
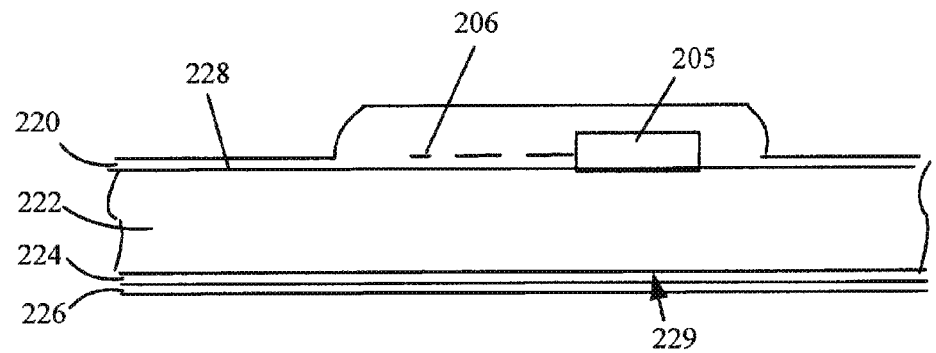
FIG. 2D is a diagrammatic representation of an RFID tag tape, in accordance with certain configurations of the present disclosure.

FIG. 2D is a diagrammatic representation of a portion of RFID tag tape 202, in accordance with certain configurations of the present disclosure. FIG. 2D illustrates a cross-sectional view of RFID tag tape 202 along the plane of RFID tag tape 202 viewed in the direction of arrow IIB in FIG. 2A. RFID tag tape 202 comprises substrate 222 made from a firm but flexible material such as clear tape plastic or paper. RFID tag tape 202 further comprises RFID tag 204 mounted on top surface 228 of substrate 222. In certain configurations, RFID tag 204 is mounted on top surface 228 using a non-removable adhesive. In certain configurations, RFID tag 204 is mounted on top surface 228 by laying down electronic components (e.g., antenna coil 206 and an integrated circuit 205) of RFID tag 204 on top surface 228 and covering the electrical components by a protective cover. In certain embodiments, RFID tag tape 202 comprises substrate 222 covered with a layer of adhesive, on which a plurality of RFID tags 204 are placed such that, during use, an RFID tag 204 can be peeled off RFID tag tape 202 and applied to an inventory item 102.

In certain configurations, adhesive layer 224 covers bottom surface 229 of substrate 222. In certain configurations, adhesive layer 224 is covered by an optional peelable layer 226. Peelable layer 226 protects adhesive layer 224 from unwanted adhesion prior to affixation to inventory item 102 by a user. A user will peel off peelable layer 226 and affix RFID tag tape 202 to inventory item 102. In certain embodiments, peelable layer 226 is made from a non-stick peelable material such as wax paper or a thin film of non-stick plastic. Adhesive layer 224 is made from one of several well known pressure sensitive adhesive materials such as epoxy, in certain embodiments.

Protective layer 220 is applied to top surface 222 and RFID tag 204 to protect electrically sensitive antenna elements from wear and tear during storage and use. In certain configurations, when RFID tag tape 202 is rolled into a roll of tape, protective layer 220 is useful in protecting top surface 222 from adhesion with adhesive layer 224. In certain configurations, protective layer 220 is made from a plastic that is "transparent" to RF signals transmitted and received by antenna coil 206 (e.g., an electrically non-conductive plastic).

Figure 2E:
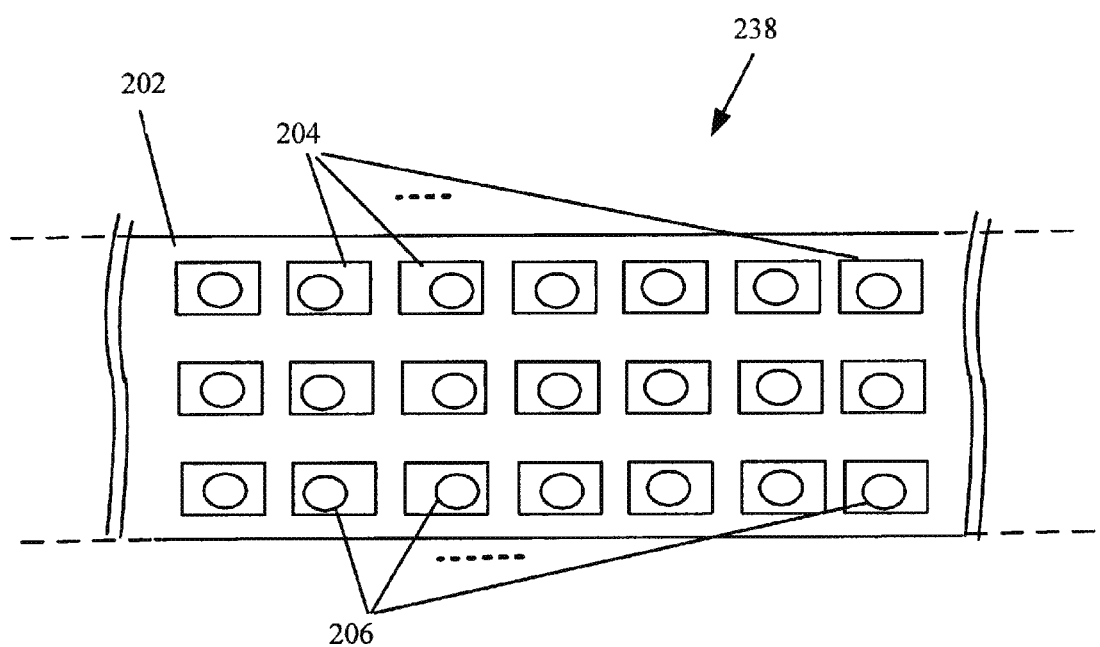
FIG. 2E is a diagrammatic representation of an RFID tag sheet, in accordance with certain configurations of the present disclosure.

FIG. 2E is a diagrammatic representation of an RFID sheet 238, in accordance with certain configurations of the present disclosure. In the embodiment illustrated in FIG. 2E, RFID tags 204 are arranged in three rows on RFID tag sheet 238. The "gift wrap" embodiment of RFID tag sheet 238, as depicted in FIG. 2E, is useful in affixing RFID tags 204 over a large surface of inventory item 102. In general, RFID tags 204 may be organized in a plurality of rows on RFID tag sheet 238, or may be mounted on RFID tag sheet 238 in any other two-dimensional pattern (e.g., random placement). In certain embodiments, RFID tag sheet 238 is stored similar to a cylindrical roll of gift wrap paper.

Figure 2F:
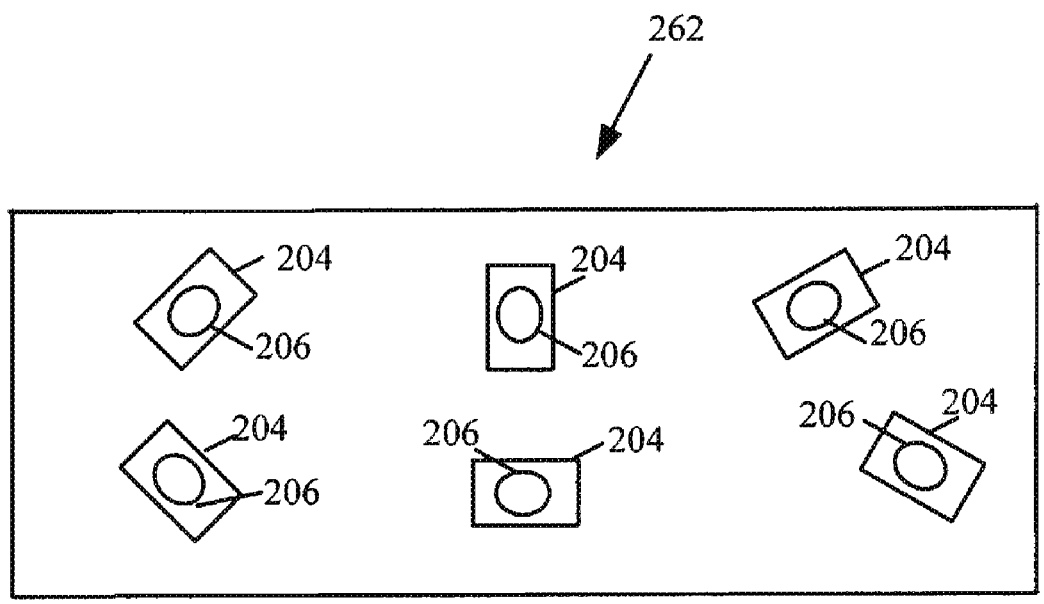
FIG. 2F is a diagrammatic representation of an RFID label, in accordance with certain configurations of the present disclosure.

FIG. 2F is a diagrammatic representation of an RFID label 262, in accordance with certain configurations of the present disclosure. In the embodiment illustrated in FIG. 2F, multiple RFID tags 204 are randomly oriented and positioned on RFID label 262. The label embodiment 262 is useful in affixing RFID tags 204 over a surface of inventory item 102 by applying a single RFID label 262 to the surface. In one aspect, random orientation of RFID rags 204 helps to improve coupling with antenna array 104 irrespective of orientation of inventory item 102.

Figure 2G:
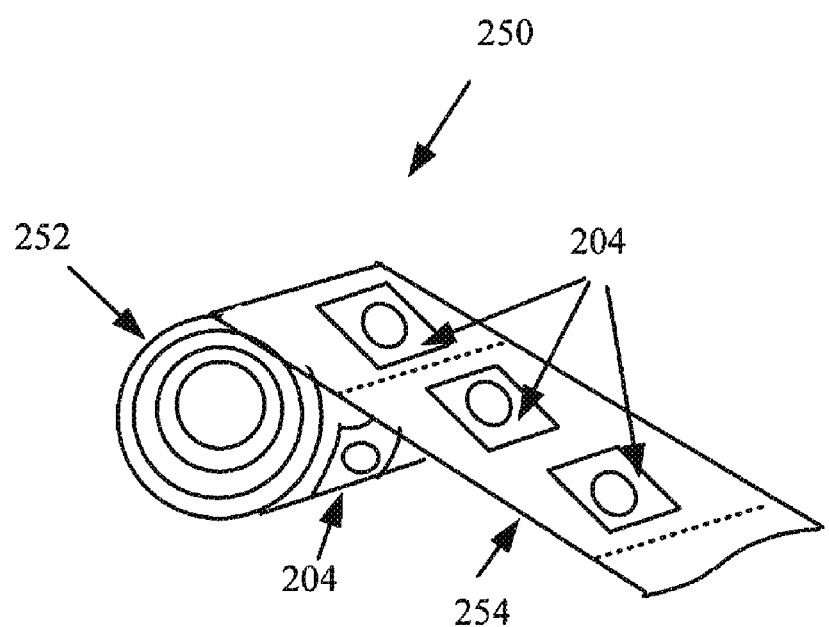
FIG. 2G is a diagrammatic representation of a roll of RFID tag tape, in accordance with certain configurations of the present disclosure.

FIG. 2G is a diagrammatic representation of a roll of RFID tag tape 202. RFID tag roll 250 is depicted to have rolled portion 252 and rolled out tape portion 254 (e.g., for affixation during use), with a plurality of RFID tags 204 visible on both rolled portion 252 and rolled out tape portion 254.

Still referring to FIG. 2E, the greater two-dimensional extent of RFID tag sheet 238 compared to RFID tag tape 202 makes it useful for application to a large two-dimensional area (e.g. large surface of a pizza box shaped inventory item 102). In certain embodiments, RFID tag sheet 238 is fabricated from the same materials, described with respect to FIGS. 2A to 2D.

Figure 3A:
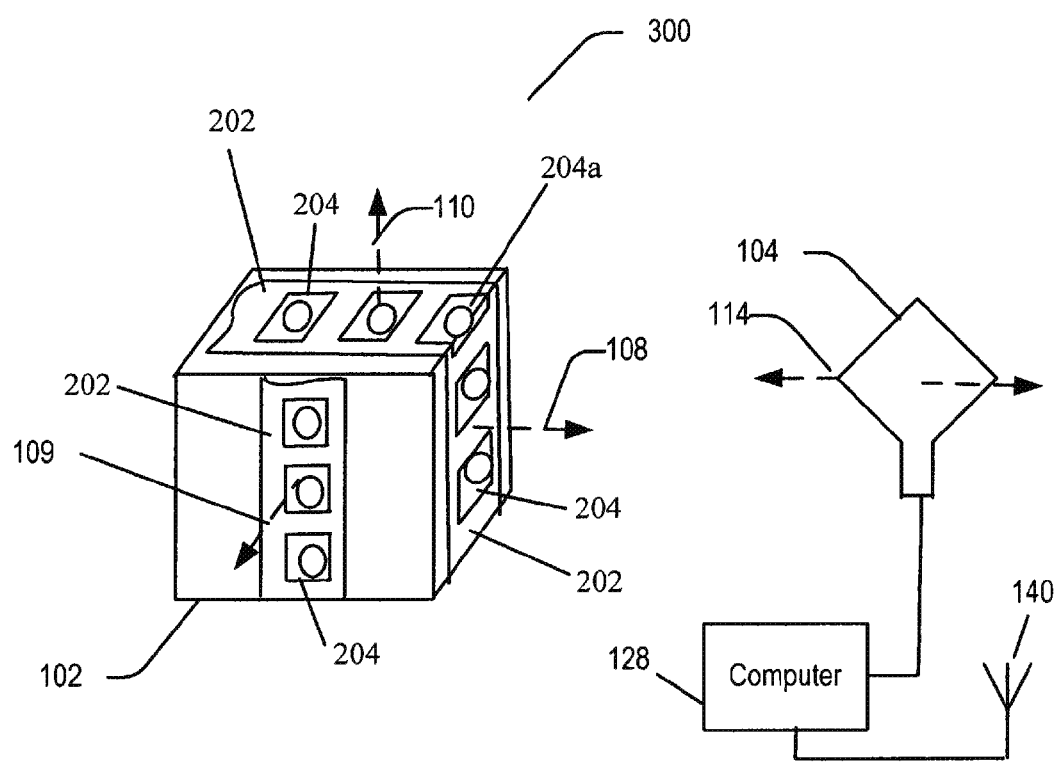
FIG. 3A is a diagrammatic representation of an RFID inventory tracking system, in accordance with certain configurations of the present disclosure.

FIG. 3A is a diagrammatic representation of RFID inventory tracking system 300, in accordance with certain configurations of the present disclosure. Inventory item 102 is "wrapped" with RFID tag tape 202, such that a plurality of surfaces of inventory item 102 are affixed with at least one RFID tag 204. While inventory item 102 is depicted in FIG. 3A as having a cubical shape, in general inventory item 102 may have any shape and may have non-uniform surfaces (e.g., a round surface). Regardless of the shape of inventory item 102, a user generally can affix on or more pieces of RFID tag tape 202 on multiple surfaces of inventory item 102 such that RFID tags are affixed with antenna axes pointing in various directions with respect to each other. In certain configurations, some individual RFID tags (e.g., RFID tag 302) may be wrapped across an edge of inventory item 102.

Still referring to FIG. 3A, in certain embodiments, computer 128 is further coupled to scanning antenna 140 via a communication module such as a printed circuit board (not shown). A user uses scanning antenna 140 to associate a plurality of RFID tags 204 with an individual inventory item 102, prior to or after affixation of the plurality of RFID tags 204 to the inventory item 102. The association operation is further described below. Scanning antenna 140 may, for example, be an RFID antenna or a barcode scanner or another one of several well-known communication devices configured to interface with computer 128. Scanning antenna 140 is not essential. For example, in certain embodiments, antenna array 104 may be configured to perform operations of antenna 140. In certain embodiments, the user uses a keyboard and/or a touch screen to associate the plurality of RFID tags 204 with an individual inventory item 102.

In system 300, RFID tags are affixed around inventory item 102 such that three antenna axes 108, 109 and 110 make inventory item 102 "visible" to antenna array 104, regardless of the orientation of inventory item 102 with respect to the antenna axis 114 for the antenna array 104. This ensures that the probability of an error in counting inventory item 102 regardless of the placement and orientation of inventory item 102 is low. In general, for inventory item 102 having non-uniform surfaces, wrap-around application of RFID tag tape 202 affixes multiple RFID tags 204 in multiple orientations, thereby increasing the probability that one or more of RFID tags 204 are sensed by antenna array 104, regardless of the orientation of the inventory item 102 with respect to antenna array 104.

Still referring to FIG. 3A, on occasions, for a successful sensing of inventory item 102 by antenna array 104, alignment of antenna axes of RFID tag 204 and antenna array 104 may not be sufficient. For example, inventory item 102 has three additional surfaces not visible in FIG. 3A, corresponding to the surfaces opposite to the visible surfaces. The antenna axis for both RFID tags 204 affixed to the right side surface 302 and the corresponding left side surface (not visible in FIG. 3A) are in the direction of antenna axis 108. However, it is possible that for inventory item 102 affixed to the left side surface, even when the antenna axis of RFID tag 204 is aligned in the direction of antenna array 104, RE sensing by antenna array 104 may not happen because inventory item 102 may attenuate signal communication path between RFID tag 204 affixed to the left side surface and antenna array 104. Therefore, in general, for high probability (e.g., 99.999%) of sensing of inventory item 102 by antenna array 104, RFID tag 204 may both need to have its antenna axis aligned with that of antenna array 104 and RFID tag 204 is also not occluded by inventory item 102 to which RFID tag 204 is affixed (e.g., clear line-of-sight between antenna array 104 and RFID 204).

By way of example, and not limitation, certain embodiments of inventory tracking systems in accordance with the principles of the present disclosures are now described. While the embodiments are described with reference to storing medical inventory items in a healthcare facility, the same principals are applicable to any inventory tracking system. Some examples include mail storage facilities, inventory storage in a store, and so on.

Figure 3B:
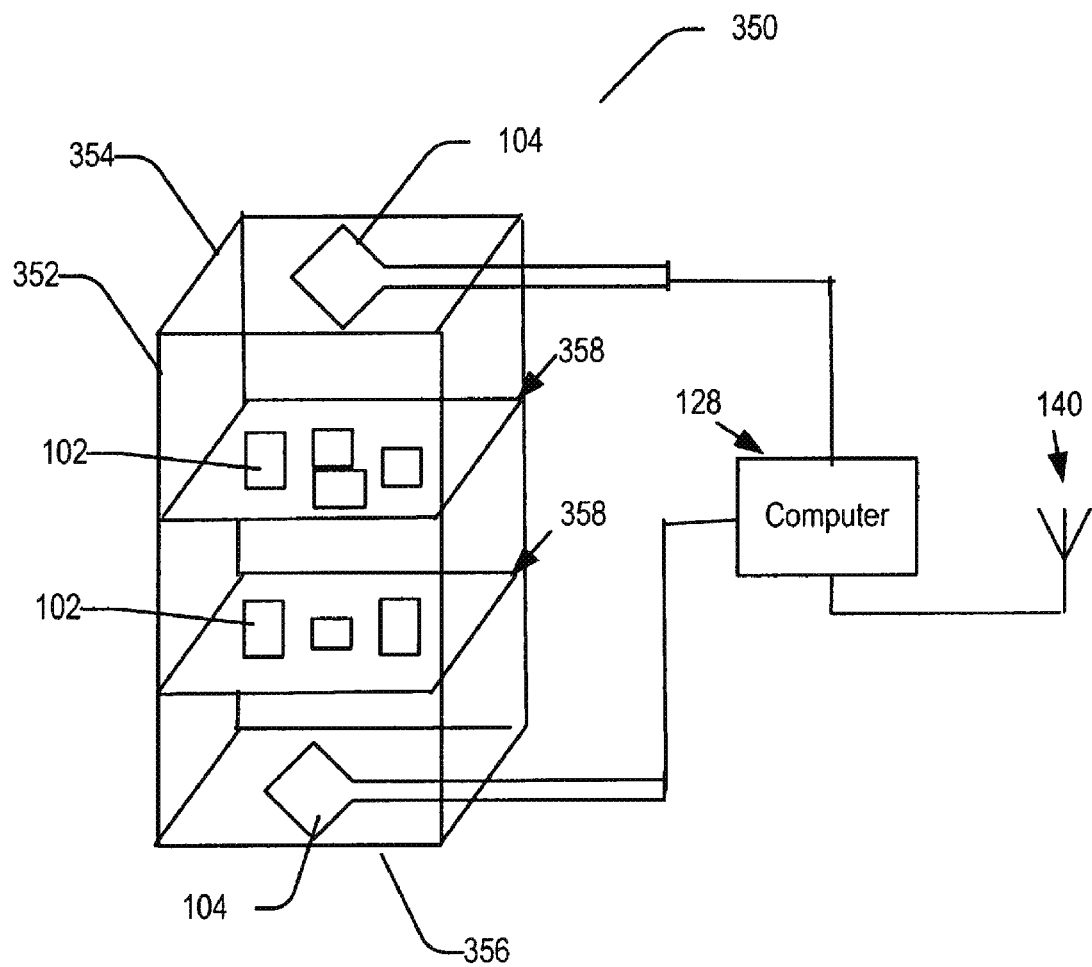
FIG. 3B is a diagrammatic representation of an RFID inventory tracking system, in accordance with certain configurations of the present disclosure.

FIG. 3B is a diagrammatic representation of RFID inventory tracking system 350, in accordance with certain configurations of the present disclosure. In a healthcare facility, inventory items 102 may be packages of medication, vials or surgical instruments stored in medical supply cabinet 352. Antenna array 104 may comprise antennae placed along sides surfaces of the medical cabinet, e.g., at the top surface 354 and the bottom surface 356 of the medical cabinet. During operation, various medical inventory items may be placed or taken out of the medical cabinet, stored on shelves 358. Medical inventory items are often stacked on top of each other. Because RFID tag tape 202 is wrapped around the inventory items (e.g., inventory item 102), medical inventory items in the medical cabinet may be detected with a very high probability regardless of the orientation of the medical inventory items or occlusion by other inventory items 102. In certain configurations, the use of RFID tag tapes 202 may also advantageously help reduce the number of antennae used in antenna array 104. For example, inventory items in a medical storage cabinet may be tracked with a high degree of confidence using only two antennae, one placed at the top of the cabinet and one placed at the bottom of the cabinet, instead of having antennae on all surfaces such as sides and back of the medical storage cabinet. As is well known in the art, capital expenses and the time taken for sensing inventory items could increase with the number of antennae used for sensing RFID tags. Furthermore, it may be desirable to keep the number of transmitting RF antennae low in order to minimize the risk of electromagnetic interference with patients and other medical equipment, as well as caregivers. In certain aspects, wrap-around application of RFID tag tape 202 advantageously facilitates operation of an inventory tracking system with fewer antennae compared to an inventory management system wherein a greater number of antennae are positioned to provide low probability of asset tracking errors.

Figure 4:
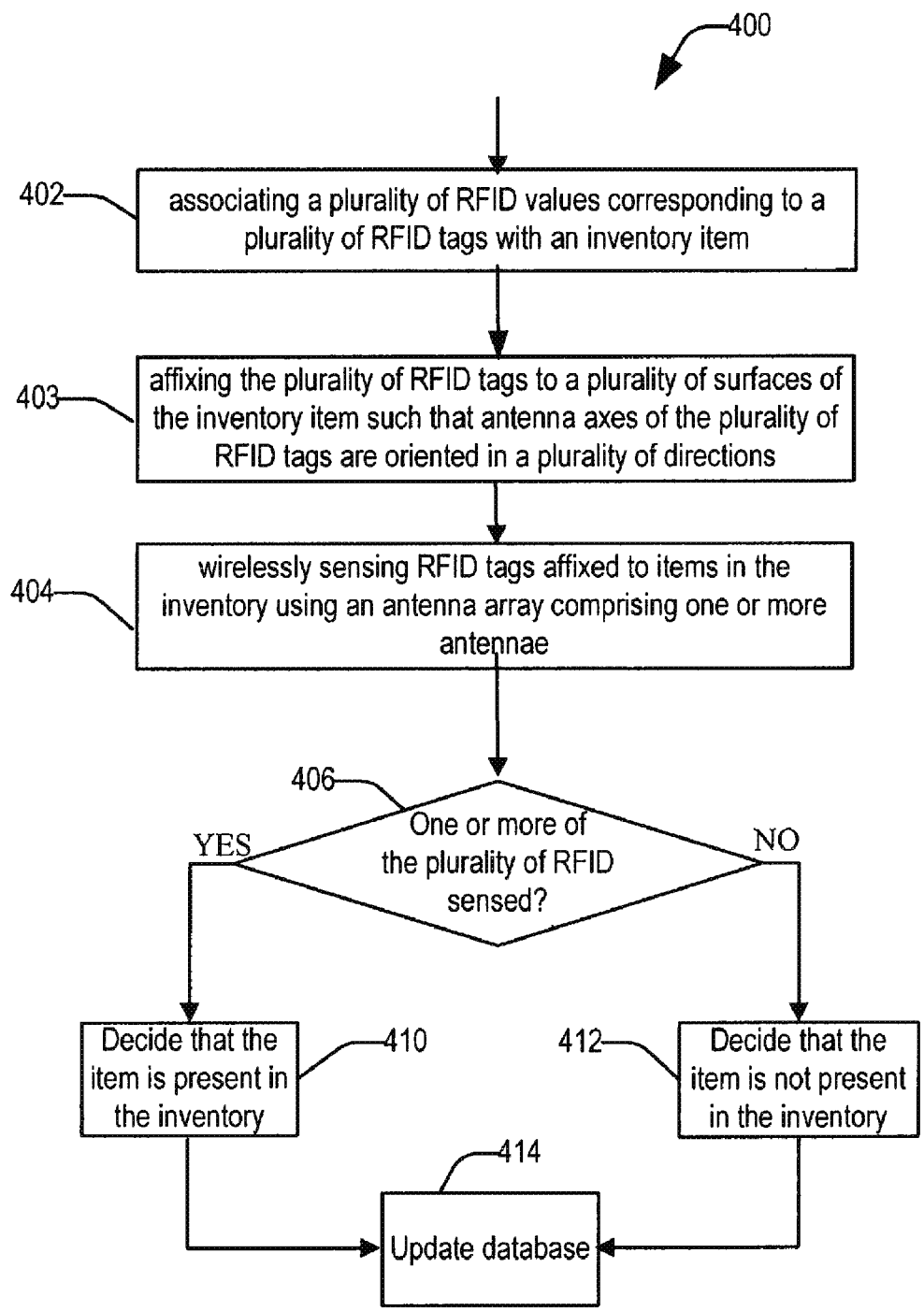
FIG. 4 is a flow chart of operations of a method of tracking inventory, in accordance with certain configurations of the present disclosure.

FIG. 4 is a flow chart of operations of process 400 of tracking inventory, in accordance with certain configurations of the present disclosure. Process 400 is implemented on computer 128, for example. At operation 402, an association is made between a plurality of RFID tag values corresponding to a plurality RFID tags and an inventory item. To facilitate operation 402, a user directs computer 128 to a "register RFIDs" mode. In this mode, a user enters, in no particular order, an identity of an inventory item and one or more RFID tag values to be associated with the inventory item into computer 128. The identity of the inventory item is, for example, an alphanumeric string of characters. The user may also optionally enter a description of the inventory item (e.g., "100 tablets of medication X"). The user enters the identity of the inventory item and any associated description using, for example, a keyboard or a touch screen in communication with computer 128. In certain embodiments, the user selects the identity of the inventory item from a drop-down list of all possible inventory item types.

Still referring to operation 402 of FIG. 4, a user enters the plurality of RFID tag values to be associated with the inventory item by entering the plurality of RFID tag values using one of a variety of methods. For example, in certain configurations, the user uses scanning antenna 140 at computer 128 that is different from any of the antenna of RFID antenna array 104 used to sense items in the inventory. To use scanning antenna 140, user holds corresponding RFID tags in proximity of scanning antenna 140, possibly at a specific angle, to wirelessly sense the RFID tags and communicate to computer 128 the sensed RFID tag values for association with the inventory item. In certain configurations, RFID tags may have human or machine readable tag values printed on them (e.g., a barcode or an alphanumeric string) and the user may either use a bar code scanner or manually enter the RFID tag values into computer 128. In certain configurations, the RFID tag values to be associated with the inventory item may be in a sequential order and the user enters a starting tag value and an ending tag value (or a range) to associate all values between and including the starting tag value and the ending tag value in the sequence of values with the inventory item. In certain configurations, there is a one-to-one correspondence between the RFID tag values a user associates with an inventory item and the values of RFID tags on the portion of RFID tag tape 202 that a user tears off for affixation to the inventory item.

Still referring to FIG. 4, at operation 403, the plurality of RFID tags are affixed to a plurality of surfaces of the inventory item such that antenna axes of the plurality of RFID tags are oriented in a plurality of directions. In certain embodiments, affixing the plurality of RFID tags to a single surface may be sufficient to make the inventory item "visible" to antenna array 104 due to variations in locations, orientations and sensitivities of individual RFID tags from the plurality of RFID tags (e.g., RFID tag tape 260 depicted in FIG. 2C or RFID tag label 262 depicted in FIG. 2F). A user may perform the affixation by, for example, unrolling a roll of RFID tag tape 202, cutting a portion of the RFID tag tape 202, and affixing the portion of the RFID tag tape 202 to one or more surfaces of inventory item 102. The user may repeat the cutting and affixation until multiple or all external surfaces of inventory item 102 have at least one RFID tag 204 affixed thereon.

Still referring to FIG. 4, in certain embodiments, the affixing operation 403 is performed prior to the associating operation 402. In such embodiments, a user first affixes RFID tags to multiple surfaces of inventory items 102 and then associates values of the affixed RFID tags with the inventory item by scanning or sensing the inventory item using antenna array 104 or scanning antenna 140.

After the associating operation 402 and the affixing operation 403 are performed, a user then places the inventory item in the inventory (e.g., supply cabinet).

Still referring to FIG. 4, at operation 404, computer 128 may wirelessly sense RFID tags 204 in the inventory using antenna array 104. Computer 128 performs operation 404 continuously, periodically or upon occurrence of certain events (e.g., opening of a door to the inventory). As is well known in the art, the sensing is performed by computer 128 transmitting query messages soliciting replies from RFID tags 204 in the range of transmission of antenna array 104. Computer 128 directs the query messages either by addressing the query messages to all RFID tags or to a subset of RFID tags, as indicated in an address field in a transmitted query message. When antenna array 104 receives RF signals carrying RFID messages from RFID tags 204, antenna array 104 communicates the received messages to computer 128. Computer 128 then processes the received messages to extract RFID tag values present therein, if any.

From time to time, or upon occurrence of certain events (e.g., opening of a door to an inventory storage area), computer 128 performs operation 406 to determine if sensed RFID tag values correspond to known inventory items (i.e., inventory items for which the associative operation 402 was previously performed). If one or more of the sensed RFID tag values match one of the plurality of RFID tag values associated with an inventory item, then computer 128 decides that the inventory item is present in the inventory (operation 410). Conversely, if none of the sensed RFID tag values matches any of the plurality of RFID tag values associated with an inventory item, then the computer decides, at operation 412, that the item is not present in the inventory. At operation 414, computer 128 updates an inventory database to reflect the decision made in either operation 410 or operation 412.

Figure 5:
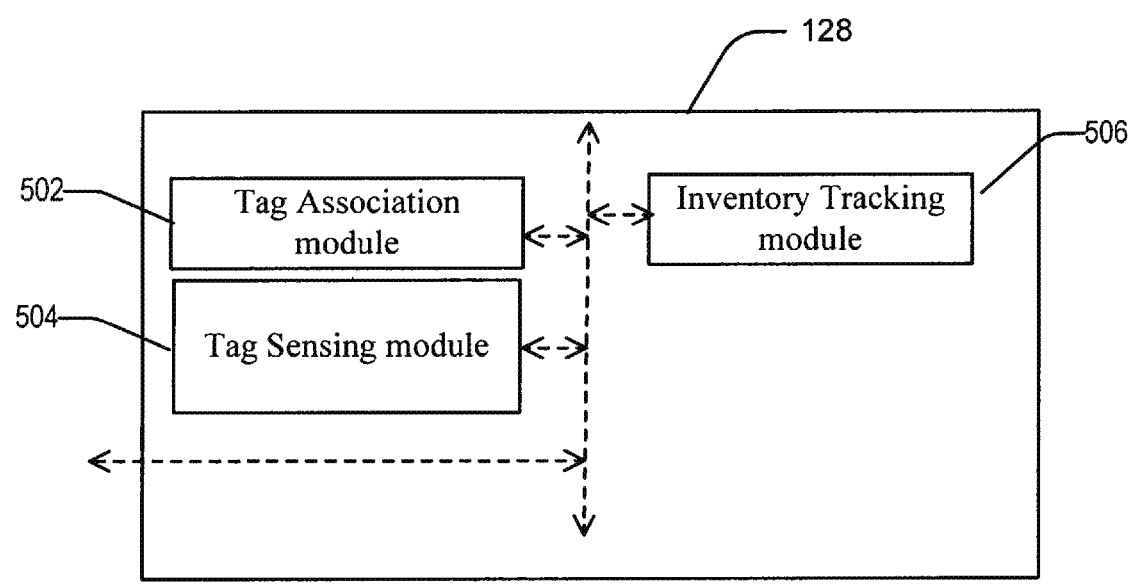
FIG. 5 is a block diagram that illustrates an exemplary computer system, in accordance with certain configurations of the present disclosure.

FIG. 5 is a block diagram that illustrates certain relevant modules of computer 128, in accordance with certain configurations of the present disclosure. Those skilled in the art would appreciate that the various illustrative modules may be implemented as electronic hardware, computer software, or combinations thereof. Computer 128 comprises tag association module 502. In certain configurations, tag association module 502 may perform operation 402 described above. Computer 128 comprises tag sensing module 504. In certain configurations, tag sensing module 504 performs operation 404 described above. Computer 128 comprises inventory tracking module 506. In certain configurations, inventory tracking module 506 performs operations 406, 410, 412 and 414 described above.

Figure 6:
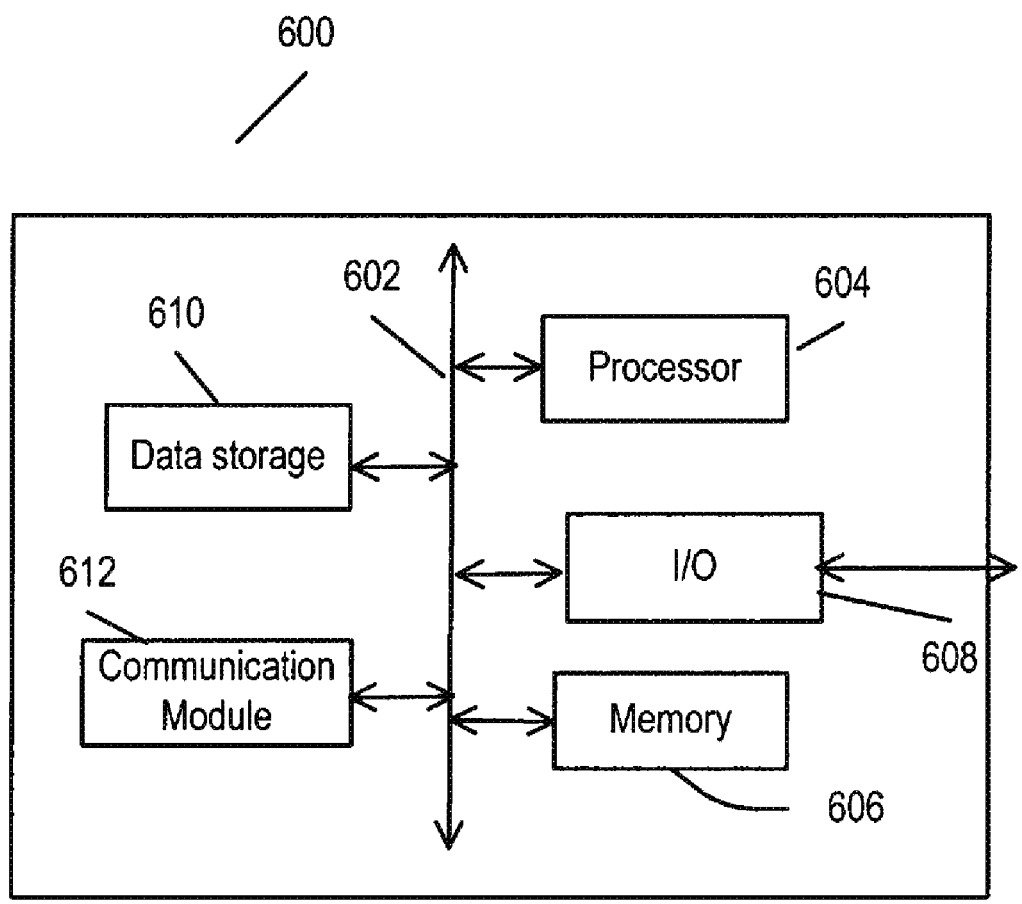
FIG. 6 is a block diagram that illustrates an exemplary computer system, in accordance with certain configurations of the present disclosure.

FIG. 6 is a block diagram that illustrates computer system 600 in accordance with certain configurations of the present disclosure. In certain embodiments, computer system 600 operates as computer 128 used for inventory control. Computer system 600 includes a bus 602 or other communication mechanism for communicating information, and a processor 604 coupled with bus 602 for processing information. Computer system 600 also includes a memory 606, such as a random access memory ("RAM") or other dynamic storage device, coupled to bus 602 for storing information and instructions to be executed by processor 604. Memory 606 can also be used for storing temporary variable or other intermediate information during execution of instructions to be executed by processor 604. Computer system 600 further includes a data storage device 610, such as a magnetic disk or optical disk, coupled to bus 602 for storing information and instructions.

Computer system 600 may be coupled via I/O module 608 to a display device (not illustrated), such as a cathode ray tube ("CRT") or liquid crystal display ("LCD") for displaying information to a computer user. An input device, such as, for example, a keyboard or a mouse may also be coupled to computer system 600 via I/O module 608 for communicating information and command selections to processor 604. Computer system 600 further includes communication module 612 for interfacing with external communication components such as RFID antenna 104 or scanning antenna 140.

According to one aspect, inventory management is performed by a computer system 600 in response to processor 604 executing one or more sequences of one or more instructions contained in memory 606. Such instructions may be read into memory 606 from another machine-readable medium, such as data storage device 610. Execution of the sequences of instructions contained in main memory 606 causes processor 604 to perform the process steps described herein. One or more processors in a multi-processing arrangement may also be employed to execute the sequences of instructions contained in memory 1206. In alternative aspects, hard-wired circuitry may be used in place of or in combination with software instructions to implement various aspects. Thus, aspects are not limited to any specific combination of hardware circuitry and software.

The term "machine-readable medium" as used herein refers to any medium that participates in providing instructions to a processor for execution. Such a medium may take many forms, including, but not limited to, non-volatile media, volatile media, and transmission media. Non-volatile media include, for example, optical or magnetic disks, such as a data storage device. Volatile media include dynamic memory. Transmission media include coaxial cables, copper wire, and fiber optics, including the wires that comprise a bus connecting processors and memory sections. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative sections, modules, elements, components, methods, and algorithms described herein may be implemented as electronic hardware, computer software, or combinations of both. Furthermore, these may be partitioned differently than what is described. To illustrate this interchangeability of hardware and software, various illustrative sections, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or sections in the processes disclosed is an illustration of exemplary approaches. Based upon design preferences, it is understood that the specific order or hierarchy of steps or sections in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Although embodiments of the present disclosure have been described and illustrated in detail, it is to be clearly understood that the same is by way of illustration and example only and is not to be taken by way of limitation, the scope of the present disclosure being limited only by the terms of the appended claims. Furthermore, one skilled in the art will recognize that while the present disclosure is generally described with reference to inventory management in a healthcare facility, certain configurations of the present disclosure may be used in inventory management systems used elsewhere.

What is claimed is:

1. A method of tracking an inventory, comprising the steps of:
   dispensing a portion of an RFID tape, wherein the dispensed portion comprises a plurality of radio frequency identification (RFID) tags;
   affixing the dispensed portion of the RFID tape to an inventory item such that antenna axes of the plurality of RFID tags are oriented in a plurality of directions;
   associating the plurality of RFID tags of the dispensed portion of the RFID tape with the inventory item;
   wirelessly sensing at least one of the RFID tags of the RFID tape affixed to the inventory item; and
   deciding, if the at least one of the RFID tags associated with the inventory item is sensed, that the inventory item is present in the inventory.

2. The method of claim 1, wherein the step of affixing comprises affixing the dispensed portion of the RFID tag tape onto at least two adjacent external surfaces of the inventory item.

3. The method of claim 1, wherein the plurality of RFID tags are randomly oriented on the RFID tag tape.

4. The method of claim 1, wherein the plurality of RFID tags comprise a respective plurality of RFID values that are in a sequential order.

5. The method of claim 1, wherein the plurality of RFID tags comprise a respective plurality of RFID values that are in a random order.

6. The method of claim 1, wherein the step of associating comprises wirelessly sensing the plurality of RFID tags using a scanning antenna.

7. The method of claim 1, wherein the step of associating comprises wirelessly sensing the plurality of RFID tags using an antenna array comprising one or more antennae.

8. An inventory tracking system, comprising:
   a radio frequency identification (RFID) tape comprising:
      a substrate having a bottom surface;
      a plurality of RFID tags mounted on the substrate; and
      an adhesive layer coupled to the bottom surface of the substrate;
      wherein the RFID tape is configured such that a dispensed portion of the RFID tape comprises a plurality of RFID tags;
   an antenna array comprising one or more antennae configured to sense RFID tags; and
   a computer coupled to the antenna array and configured to track a plurality of inventory items.

9. The inventory tracking system of claim 8, further comprising a medical supply cabinet for storing the plurality of inventory items.

10. The inventory tracking system of claim 9, wherein the antenna array comprises a first antenna mounted on a top surface of the medical supply cabinet and a second antenna mounted on a bottom surface of the medical supply cabinet.

11. The inventory tracking system of claim 8, wherein the plurality of RFID tags are randomly oriented on the RFID tape.

12. The inventory tracking system of claim 8, wherein the plurality of RFID tags are arranged in a plurality of rows on the RFID tape.

13. The inventory tracking system of claim 8, further comprising a scanning antenna different from the one or more antennae of the antenna array communicatively coupled to the computer.

14. An RFID tag tape for use in an inventory tracking system, the tape comprising:
   a substrate having a bottom surface;
   a plurality of RFID tags coupled to the substrate, each RFID tag comprising an antenna for transmitting and receiving radio frequency signals; and
   an adhesive layer covering at least a portion of the bottom surface of the substrate,
   wherein each of the plurality of RFID tags has an associated unique identifier;
   wherein the RFID tag tape is capable of being rolled into a roll, and
   wherein the RFID tape is configured such that a dispensed portion of the RFID tape comprises a plurality of RFID tags.

15. The RFID tag tape of claim 14, further comprising:
   a peelable layer covering the adhesive layer, the peelable layer provided to protect the adhesive layer from adhesion to the RFID tag tape when rolled into a roll.

16. The RFID tag tape of claim 14, further comprising:
   a protective layer covering the top surface and the plurality of RFID tags, the protective layer for protecting the plurality of RFID tags from wear and tear.

17. The RFID tag tape of claim 14, wherein the plurality of RFID tags are arranged in a single row on the substrate.

18. The RFID tag tape of claim 17, further comprising perforations wherein at least two RFID tags are disposed between adjacent perforations.

19. The RFID tag tape of claim 14, wherein the plurality of RFID tags are arranged in a plurality of rows on the substrate.

20. The RFID tag tape of claim 14, wherein the plurality of RFID tags are randomly oriented.

21. The RFID tag tape of claim 14, wherein the plurality of RFID tags comprise more than one of RFID tag types from a magnetically coupled RFID tag, an electrically coupled RFID tag, and a multiple frequency RFID tag.

* * * * *